United States Patent
Mottier et al.

(10) Patent No.: US 7,061,881 B2
(45) Date of Patent: Jun. 13, 2006

(54) METHOD OF ALLOCATING A TRANSMISSION POWER LEVEL TO PILOT SYMBOLS USED FOR ESTIMATING THE CHANNEL OF A TRANSMISSION SYSTEM OF THE MULTICARRIER TYPE WITH SPREADING OF THE SIGNAL IN THE FREQUENCY DOMAIN BY SPREADING SEQUENCES

(75) Inventors: David Mottier, Rennes (FR); Thomas Saelzer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 864 days.

(21) Appl. No.: 09/944,375

(22) Filed: Sep. 4, 2001

(65) Prior Publication Data

US 2002/0044540 A1   Apr. 18, 2002

(30) Foreign Application Priority Data

Sep. 14, 2000   (FR) ................................. 00 11834

(51) Int. Cl.
*H04B 7/185* (2006.01)
*H04B 7/216* (2006.01)
*H04B 17/02* (2006.01)
*H04J 11/00* (2006.01)

(52) U.S. Cl. .................... 370/318; 370/320; 370/208; 370/335; 455/13.4; 455/135

(58) Field of Classification Search ............... 370/208, 370/318, 320, 319, 335, 329, 332, 340, 210, 370/342; 455/13.4, 134, 135; 375/227, 375/340, 224, 147

See application file for complete search history.

(56) References Cited

U.S. PATENT DOCUMENTS

| | | | |
|---|---|---|---|
| 6,404,826 B1 * | 6/2002 | Schmidl et al. ............. | 375/340 |
| 6,625,111 B1 * | 9/2003 | Sudo .......................... | 370/203 |
| 6,680,928 B1 * | 1/2004 | Dent .......................... | 370/342 |
| 6,888,789 B1 * | 5/2005 | Sakoda et al. .............. | 370/208 |
| 6,904,283 B1 * | 6/2005 | Li et al. ...................... | 455/450 |

OTHER PUBLICATIONS

Patent Abstracts of Japan, JP 07 202973, Aug. 4, 1995.
S. Kaiser, et al., Gateway to 21st Century Communications Village. VTC 1999-Fall. IEEE VTS 50th Vehicular Technology Conference (Cat. No. 99CH36324), vol. 5, pp. 2701-2705, "Asynchronous Spread Spectrum Multi-Carrier Multiple Access Systems with Pilot Symbol Aided Channel Estimation", 1999.

* cited by examiner

*Primary Examiner*—Hanh Nguyen
(74) *Attorney, Agent, or Firm*—Oblon, Spivak, McClelland, Maier & Neustadt, P.C.

(57) ABSTRACT

A method of determining transmission power of transmitted pilot symbols used for estimating channel coefficients in a transmission frame of a multicarrier transmission system having OFDM-CDMA, MC-CDMA, MC-CDM or MC-SS-MA frequency domain spreading sequences. The method includes determining a performance level to be achieved by the transmission, deducing the signal to noise ratio level introduced by the channel from the performance level to be achieved, deducing a single code transmission power $Q_0$ of the pilot symbols for a single spreading code from the signal to noise ratio level, deducing an increase in power $\alpha$ for transmitting the pilot symbols using a number of spreading codes K, and determining the transmission power Q of the pilot symbols at predetermined times, based on the following equations:

$Q = \alpha(K-1) + Q_0$; $K > 1$; $\alpha > 0$; and $Q_0 > \alpha$.

7 Claims, 3 Drawing Sheets

METHOD OF ALLOCATING A TRANSMISSION POWER LEVEL TO PILOT SYMBOLS USED FOR ESTIMATING THE CHANNEL OF A TRANSMISSION SYSTEM OF THE MULTICARRIER TYPE WITH SPREADING OF THE SIGNAL IN THE FREQUENCY DOMAIN BY SPREADING SEQUENCES

BACKGROUND OF THE INVENTION

1. Field of the Invention

The present invention concerns a method of allocating a transmission power level to pilot symbols used for estimating the channel of a transmission system of the multicarrier type with spreading of the signal in the frequency domain by spreading sequences, generally referred to as an MC-CDMA (Multi-Carrier Coded Division Multiple Access) or OFDM-CDMA (Orthogonal Frequency Division Multiplex—Code Division Multiple Access) transmission system. It may also be a case of a system of the MC-CDM (Multi-Carrier Code Division Multiplex) or MC-SS-MA (Multi-Carrier Spread-Spectrum Multiple Access) type.

2. Discussion of Background

Amongst the transmission systems making it possible to manage several communications between distinct users simultaneously and in the same frequency band, there is the multicarrier code division multiple access transmission technique, more commonly known as the MC-CDMA technique, descriptions of which can be found in the article by S. Hara and R. Prasad entitled "Overview of multicarrier CDMA" which appeared in IEEE Communications magazine, vol.35, pp 126–133 of December 1997, and in the article by N. Yee and J. P. Linnartz entitled "Wiener filtering of multicarrier CDMA in a Rayleigh fading channel" which appeared in proceedings PIMRC '94, pp.1344–1347 of 1994.

FIG. 1 depicts schematically a transmission system of the MC-CDMA type. It includes a transmitter 10 which communicates with a receiver 20 via a propagation channel 30. For example, if the channel 30 is a down channel in a mobile communication network, the transmitter 10 is that of a base station in the said network and the receiver 20 is that of a mobile in communication with the said base station. If conversely the channel 30 is an up channel in the same network, then the transmitter 10 is that of a mobile and the receiver 20 is that of the base station.

In this MC-CDMA system, the n-th data item, denoted $d^{(k)}[n]$, of the k-th user is applied to the input of each of the multipliers $11_0$ to $11_{N-1}$ in order to be multiplied therein by an element $c_0^{(k)}$ to $c_{N-1}^{(k)}$ of a spreading sequence peculiar to the user k. The constant N represents the length of the spreading sequence.

It assumed here, for simplification, that each user k uses only one spreading sequence. However, this may not be the case and thus several spreading sequences, or even all the spreading sequences, may be allocated to one user. It should be noted that, in the latter case, although it is no longer a question strictly speaking of multiple access, the method according to the invention also applies.

The result of each multiplication of order m is then subjected to modulation by a frequency sub-carrier ($f_c+m.F/T_b$), in a modulator $12_0$ to $12_{N-1}$. The value $F/T_b$ represents the spacing between two consecutive sub-carriers, F being an integer and $T_b$ being the duration of the data $d^{(k)}[n]$ excluding the guard time. The orthogonality between the sub-carriers is guaranteed if these are spaced apart by multiples of $F/T_b$.

It should be noted that this modulation operation amounts to a multiplication by an expression of the form $\exp(j2\pi(f_c+m.F/T_b)t)$.

The spreading is thus effected in the frequency domain.

It should also be noted that it is assumed here (in particular in FIG. 1), for reasons of simplification, that the length of the spreading sequence N is equal to the number of sub-carriers M, that is to say the data of each user are transmitted successively. This is not necessarily the case.

The modulated signals are then summed in an adder 14 and sent over the propagation channel 30. Thus an expression of the signal transmitted outside the guard time at each time t, corresponding to the n-th data item of the k-th user, can be written:

$$e^{(k)}(n,t) = \begin{cases} d^{(k)}[n]\sum_{m=0}^{N-1} c_m^{(k)}\exp\left[j2\pi\left(f_c + m\frac{F}{T_b}\right)t\right] & \text{if } t \in [-T_b/2, T_b/2] \\ 0 & \text{if not} \end{cases} \quad (1)$$

In order to simplify the description, it is assumed that this is a "down channel" context where the propagation channel is identical for all the users. To simplify the notation, the above equations do not mention the index n of the data transmitted. In addition, it is assumed that time t=0.

Consider then the contribution $s_m$ on each carrier m of data d issuing from a base station and intended for K users (it is assumed for reasons of simplification that each user uses only one spreading sequence):

$$s_m = \sum_{k=1}^{K} d^{(k)} c_m^{(k)} \quad (2)$$

In practice, the propagation channel 30 may be obstructed by dwellings and other obstacles situated between the transmitter 10 and receiver 20 and fulfilling the role of reflector for the transmitted waves. The signal sent is then propagated in multiple paths, each of the paths being differently delayed and attenuated. The propagation propagation channel 30 may also be subjected to other interference. In general terms, it then acts as a filter whose transfer function h(f,t) varies over time.

Let $h_m$ be the channel coefficient on the carrier m at the receiver 20 of the user in question. The channel coefficients $h_m$ are complex, that is to say they can be expressed in the form $h_m = \alpha_m \exp(-j\phi_m)$ where $\alpha_m$ is the attenuation and $\phi_m$ the phase of the coefficient.

In the synchronous case, the signal received on each sub-carrier for all the K users can then be written as follows:

$$r_m = h_m \sum_{k=1}^{K} (d^{(k)} c_m^{(k)}) + n_m \quad (3)$$

where $n_m$ represents the white additive Gaussian noise sample on the carrier m.

At the receiver 20, a detection is effected in order to be able to recover, from the received signal $r_m$, the data sent $d^{(k)}[n]$.

FIG. 1 depicts a receiver 20 which applies a detection of the Maximum Ratio Combining (MRC) type. The received signal $r^{(k)}(n,t)$ is previously supplied to demodulators $21_0$ to $21_{N-1}$ which then deliver demodulated signals $r_0$ to $r_{N-1}$. Each demodulated signal $r_m$ is applied to a first multiplier $22_m$ in order to be multiplied therein by the conjugate complex $h_m^*$ of the coefficient $h_m$ of the propagation channel 30 which affects the carrier of index m in question and then to a second multiplier $23_m$ in order to be multiplied therein by the element $c_m^{(k)}$ associated with this carrier of index m of the spreading code attributed to the user k. The resulting signals are then summed in the adder 24 on all the sub-carriers, so that the decision variable resulting from this detection process is:

$$\hat{d}^{(k)} = \frac{1}{N}\sum_{m=0}^{N-1} h_m^* c_m^{(k)} r_m \qquad (4)$$

$$= d^{(k)} + \frac{1}{N}\sum_{g=0, g\neq k}^{K-1}\sum_{m=0}^{N-1} |h_m|^2 d^{(g)} c_m^{(k)} c_m^{(g)} + \frac{1}{N}\sum_{m=0}^{N-1} c_m^{(k)} h_m^* n_m$$

The decision variable therefore contains three terms: firstly the required symbol, secondly the interference with the other users and thirdly the residual noise after recombination.

The ability of MC-CDMA transmission systems to ensure orthogonality between the signals of the different users in the network depends on the properties of intercorrelation of the spreading sequences used by these users.

It should be noted that this detection process, like any detection process, requires knowledge of the coefficients of the channel $h_m$. In equation (4) given above, the coefficient $h_m$ of the channel 30 is an estimation which is deemed to be perfect. However, because of the fact that the propagation channel 30 has a transfer function which varies with time and according to the frequency of the carrier in question, an estimation of the coefficients $h_m$ must be made at each time t. To do this, certain useful symbols $s_m$ of the frame sent by the transmitter 10 are replaced by symbols of known value $p_m$, symbols generally referred to as "pilot symbols".

FIG. 2 depicts an MC-CDMA frame. It can be seen that, at each time $nT_b$, a new MC-CDMA symbol is transmitted which consists of N complex symbols transmitted on the N sub-carriers. Each symbol transmitted is here denoted $s_m$ if it is a case of user data and $p_m$ if it is a case of pilot symbols. It should be noted that the distribution of the pilot symbols in the MC-CDMA frame can vary according to the statistical properties of the propagation channel 30.

As depicted in FIG. 1, the pilot symbols $p_m$ contained in the MC-CDMA frame are analysed in an estimation unit 25 which includes the receiver 20 and which delivers, for each position in the MC-CDMA frame, an estimation of each coefficient $h_m$, an estimation which will be denoted hereinafter $\hat{h}_m$.

For each position where there is a pilot symbol $p_m$, the estimated coefficient $\hat{h}_m$ can be given by the following equation:

$$\hat{h}_m = \frac{r_m}{p_m} = \frac{h_m \cdot p_m + n_m}{p_m} = h_m + \frac{n_m}{p_m} \qquad (5)$$

For these same positions, the estimated coefficient $\hat{h}_m$ can also be determined using smoothing means.

The channel coefficients for positions other than the pilot positions are determined by interpolation, smoothing and prediction means. Thus, whatever the means used to obtain each estimated channel coefficient $\hat{h}_m$, the latter is equal to the coefficient $h_m$ itself to which there is added a noise $\eta_m$ which degrades the channel estimation and which is referred to below as channel estimation noise. Thus each estimated channel coefficient $\hat{h}_m$ can, in general terms, be expressed as follows:

$$\hat{h}_m = h_m + \eta_m \qquad (6)$$

If in equation (4) above the value of the channel coefficient $h_m$ is replaced by its estimation $\hat{h}_m$ here calculated by means of equation (6), it can be found that the channel estimation noise causes additional interference at the level of the detection process which results in a degradation of the transmission performance.

It can be shown that, if $\sigma_N^2$ is used to designate the variance of the noise on the channel $n_m$ at the level of the sub-carriers and $\sigma_\eta^2$ the variance of the estimation noise $\eta_m$ which affects the estimations of the channel coefficients, it is then possible to write the following equation:

$$\sigma_\eta^2 = \frac{\sigma_N^2}{\gamma Q} \qquad (7)$$

where Q is the transmission power of the pilot symbols $p_m$, and $\gamma$ is a smoothing gain ($\gamma \geq 1$).

It should be stated that, for a Gaussian noise, the variance is equal to the power of this noise.

According to this equation, it can be seen that the variance $\sigma_\eta^2$ of the channel estimation noise $\eta_m$ introduced by the channel estimation error depends on the transmission power Q of the pilot symbols $p_m$. Consequently, the higher the transmission power Q of the pilot symbols $p_m$, the lower is the channel estimation noise $\eta_m$. Thus it may be envisaged transmitting the pilot symbols $p_m$ at maximum power in order to improve the channel estimation. However, an increase in the power of the pilots increases the overall power consumption of the system, which represents a loss in efficiency and a financial cost.

Moreover, it can also be shown that the interference caused by the channel estimation noise $\eta_m$ increases with the number of users K, and more exactly with the number of allocated spreading codes K, for a given transmission power Q of the pilot symbols. As a result, the more the number of users K increases, the higher should be the pilot symbol transmission power.

SUMMARY OF THE INVENTION

Thus the magnitude of the additional interference is linked on the one hand to the transmission power of the pilot symbols denoted Q and on the other hand to the number K of spreading sequences used.

The problem for which an operator must provide a solution therefore consists of sizing the channel estimation, notably the power Q of the pilots, according to the number K of spreading sequences used by the communication system. More precisely, the operator must be able to choose the power of the pilots so as to ensure that the increase in the signal to noise ratio compensating for the degradation in the performance related to an imperfect channel estimation does not depend on the number of spreading sequences used.

The aim of the invention is to propose a method of allocating the pilot transmission power Q according to the number K of spreading sequences used which guarantees that the increase in the signal to noise ratio compensating for the degradation in the performance related to an imperfect channel estimation does not depend on the number of spreading sequences used.

To this end, a method of determining the transmission power of the transmitted pilot symbols according to the invention is characterised in that it includes the following steps:

a) determining a performance level to be achieved by the transmission, b) deducing, from the said performance level to be achieved, the signal to noise ratio level introduced by the channel, c) deducing from the signal to noise ratio level on the one hand the transmission power $Q_0$ of the said pilot symbols for a single spreading code allocated and on the other hand the increase $\alpha$ in power which it is necessary to give to the said pilot symbols for the following allocated spreading codes, and d) determining, at each of the predetermined times, according to the number of spreading codes used at this time, the transmission power Q of the said pilot symbols by means of the following equation:

$Q=\alpha(K-1)+Q_0$; $K \geq 1$, $\alpha>0$ and $Q_0>\alpha$

According to another characteristic of the invention, in order to determine the said signal to noise ratio level introduced by the channel, it includes the following steps:

a) deducing, from the said performance level to be achieved, the signal to noise ratio level introduced by the corresponding channel for a channel estimation deemed to be perfect, and b) increasing the said signal to noise ratio level thus deduced by a predetermined quantity which it is possible to tolerate in order to compensate for the degradations in the performance level resulting from an imperfect channel estimation.

In the present application, performance level means for example a bit or packet error rate.

According to another characteristic of the invention, the transmission power $Q_0$ of the pilot symbols for a single spreading code allocated and the increase $\alpha$ in power which it is necessary to give to the said pilot symbols for the following allocated spreading codes are determined so as to keep the performance level to be achieved identical to that which would be achieved in the case of perfect estimation.

According to another characteristic of the invention, the transmission power of the said pilot symbols for a single allocated spreading code and the increase in power which it is necessary to give to the said pilot symbols for the following allocated spreading codes are determined by means of the following equations:

$$\alpha = \frac{1}{\gamma\lambda} \text{ and}$$

$$Q_0 = \frac{N\sigma_0^2 + 1}{\gamma\lambda(\lambda-1)} + \frac{1}{\gamma\lambda}$$

where N is the number of carriers used in the said MC-CDMA transmission system, $\gamma$ is the smoothing gain used in the detection process, $\lambda$ is a factor representing the increase in signal to noise ratio of the channel which it is possible to tolerate, $\sigma_0^2$ the variance of the total interference taking into account on the one hand the noise introduced by the channel for a channel estimation deemed to be perfect and on the other hand the channel estimation error.

BRIEF DESCRIPTION OF THE DRAWINGS

The characteristics of the invention mentioned above, as well as others, will emerge more clearly from a reading of the following description of an example embodiment, the said description being given in relation to the accompanying drawings, amongst which.

DESCRIPTION OF THE PREFERRED EMBODIMENTS

Figure 1:
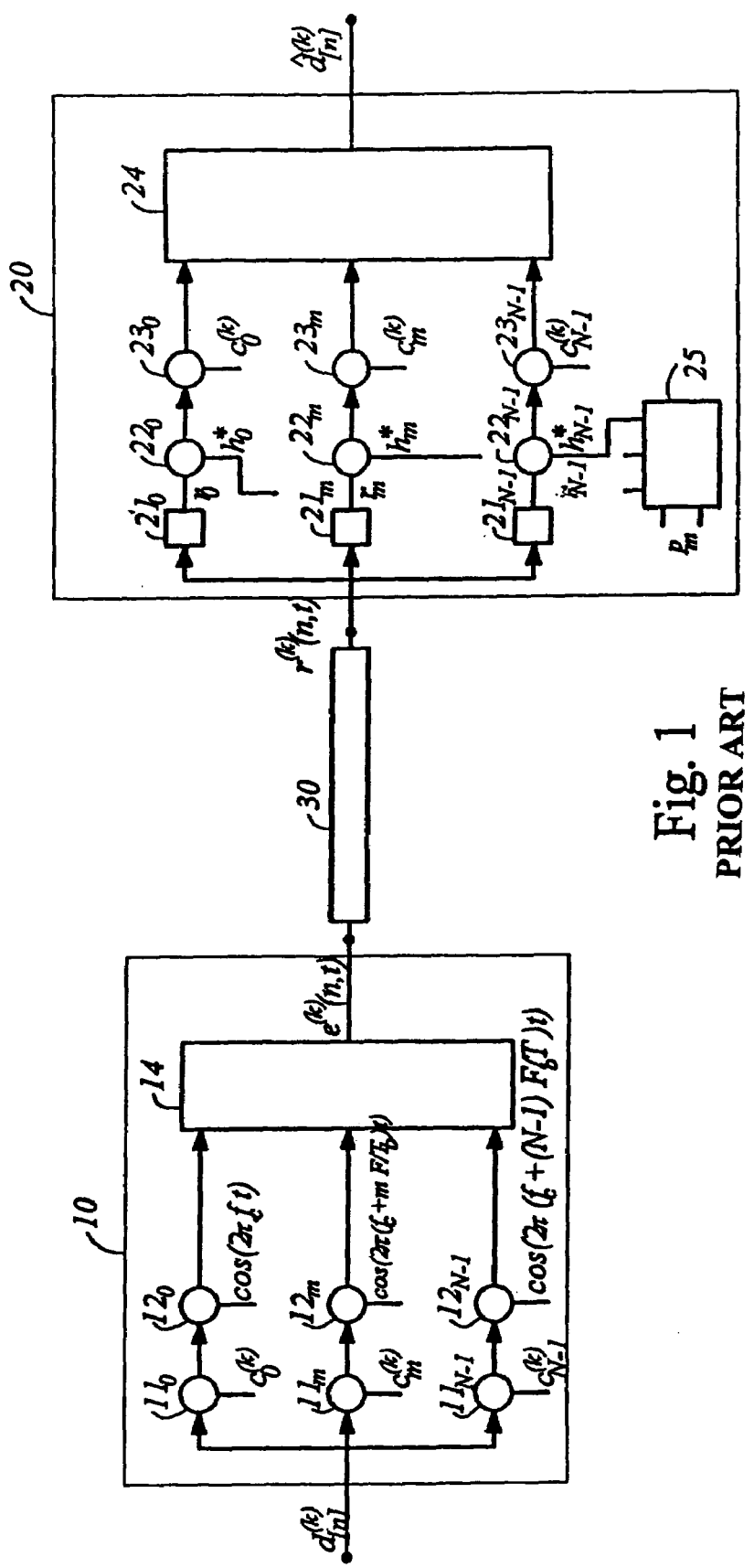
FIG. 1 is a schematic view of an MC-CDMA transmission system.
Figure 2:
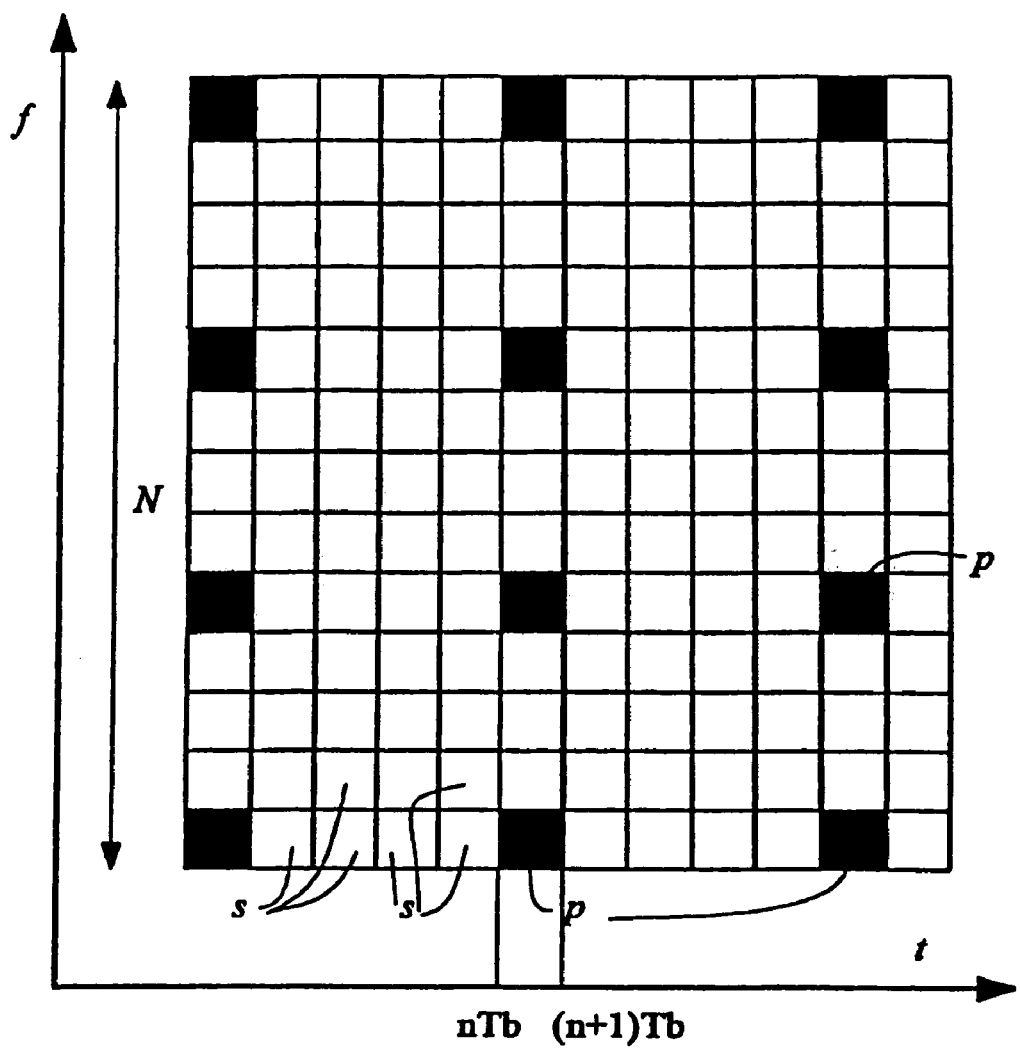
FIG. 2 is a view of a frame of an MC-CDMA transmission system.

The present description is given in relation to an MC-CDMA transmission system but a person skilled in the art will understand that it is entirely transposable to other transmission systems of the multicarrier type with spreading of the signal in the frequency domain by spreading sequences.

According to the present invention, the relationship between the power Q of the pilots $p_m$ and the number of spreading codes used is then as follows:

$Q=\alpha(K-1)+Q_0$; $K>1$, $\alpha>0$; and $Q_0>\alpha$ \hfill (8)

$Q_0$ is a parameter corresponding to the initial power of the pilot symbols which is required for a single user (K=1) and depends essentially on the loss of signal to noise ratio tolerated for the channel estimation. As for the parameter $\alpha$, it is a proportionality factor which is applied when the number of users is greater than 1.

It can be shown, by analysis or simulation, that this equation (8) is valid for the majority of known detection techniques for the MC-CDMA system, whether these are techniques for a single user (Single User Detection, SUD) or multi-user techniques (Multiuser Detection, MUD).

Ideally, the parameters $Q_0$ and $\alpha$ are related to the detection technique used and will be determined for each MC-CDMA system separately.

It has, however, been possible to show that, for the down channel of an MC-CDMA system, the initial power $Q_0$ is practically independent of the detection technique used. Apart from the fact that it depends on the loss of signal to noise ratio tolerated for the channel estimation, it also depends on the spreading factor N and the smoothing gain $\gamma$.

As for the proportionality factor $\alpha$, this depends on the detection technique and the correlation of the channel coefficients in the frequency and time domain. It also depends, like the initial power $Q_0$, on the spreading factor N, the loss tolerated for the channel estimation $\lambda$, and the smoothing gain $\gamma$.

The parameters $Q_0$ and $\alpha$ can be determined empirically, or analytically.

In the remainder of the description, an analytic expression of the initial power $Q_0$ and of the proportionality factor $\alpha$ will be given in the case of a detection of the MRC (Maximum Ratio Combining) type. It should be stated that, in this case, the decision variable $\hat{d}^{(k)}$ at the end of the detection process can be written in the form:

$$\hat{d}^{(k)} = \frac{1}{N} \sum_{m=0}^{N-1} h_m^* c_m^{(k)} r_m \quad (9)$$

$$= d^{(k)} + \frac{1}{N} \sum_{g=0, g \neq k}^{K-1} \sum_{m=0}^{N-1} |h_m|^2 d^{(g)} c_m^{(k)} c_m^{(g)} + \frac{1}{N} \sum_{m=0}^{N-1} c_m^{(k)} h_m^* n_m$$

In order to simplify the following equations, it is assumed that the power of the data $d^{(k)}$ is standardised and that the propagation channel does not affect the power of the signal received (the channel 30 causes only distortions). It is therefore possible to write:

$$E[d^{(k)} d^{(k)*}] = 1; \quad \sum_{m=0}^{N-1} |h_m|^2 = 1 \quad (10)$$

In the case of a perfect channel estimation (denoted by the index "CE perfect"), the interference affecting the decision variable $d^{(k)}$ can be considered to be a Gaussian noise.

Having regard to these assumptions, it can then be shown that the total variance, or power, $\sigma_{CE,perfect}^2$ of the interference which affects the decision variable $d^{(k)}$ is proportional to the number K of users and depends on the variance of the noise introduced by the channel at the sub-carriers $\sigma_{N,perfect}^2$, and this as given by the following equation:

$$\sigma_{CE,perfect}^2 = \frac{1}{N}(K - 1 + \sigma_{N,perfect}^2) \quad (11)$$

In order to take account of the impact of an imperfect channel estimation on the decision variable, in equation (4) above the channel coefficient $h_m$ is replaced by its estimation $\hat{h}_m$ given by the above equation (6). Two terms are then added to the decision variable $\hat{d}^{(k)}$ given by equation (4) above. They represent the channel estimation error $\Delta_{CE}^{(k)}$ which is solely due to the estimation of the channel and which represents the additional interference between users and the cross product of the components of the noise. This channel estimation error $\Delta_{CE}^{(k)}$ can then be written in the form of the following equation:

$$\Delta_{CE}^{(k)} = \frac{1}{N} \sum_{m=0}^{K-1} d^{m} \sum_{m=0}^{N-1} \eta_m^* h_m c_m^{(k)} c_m^{(g)} + \frac{1}{N} \sum_{m=0}^{N-1} \eta_m^* c_m^{(k)} n_m \quad (12)$$

It can be shown that the total variance $\sigma_{CE,imperfect}^2$ of the interference affecting the decision variable $\hat{d}^{(k)}$ taking account of an imperfect channel estimation can then be written:

$$\sigma_{CE,imperfect}^2 = \frac{1}{N}(K - 1 + \sigma_{N,imperfect}^2 + K\sigma_{\eta,imperfect}^2 + \quad (13)$$
$$\sigma_{N,imperfect}^2 \sigma_{\eta,imperfect}^2)$$
$$= \frac{1}{N}\Big(K - 1 + \sigma_{N,imperfect}^2 +$$

$$\frac{\sigma_{N,imperfect}^2}{\gamma Q}(K + \sigma_{N,imperfect}^2)\Big)$$

It is also known that the variance $\sigma_{CE,imperfect}^2$ of the noise introduced by the channel and therefore affecting the decision variable $\hat{d}^{(k)}$ is directly related to the mean bit error rate BER.

According to the present invention, the transmission power Q of the pilot symbols corresponds to the one which is necessary to ensure equality of the channel estimation variances $\sigma_{CE,perfect}^2$ and $\sigma_{CE,imperfect}^2$ respectively in the case of perfect estimation and in the case of imperfect estimation, or, which amounts to the same thing, ensuring equality of the error rates in both cases.

The following procedure will be followed.

The first step consists of fixing a required mean bit error rate as the performance level to be achieved, notably according to the application envisaged. For example, providing a voice service requires a bit error rate of around $10^{-3}$ whilst a video service of the MPEG type can be guaranteed only at bit error rates of around $10^{-9}$.

Figure 3:
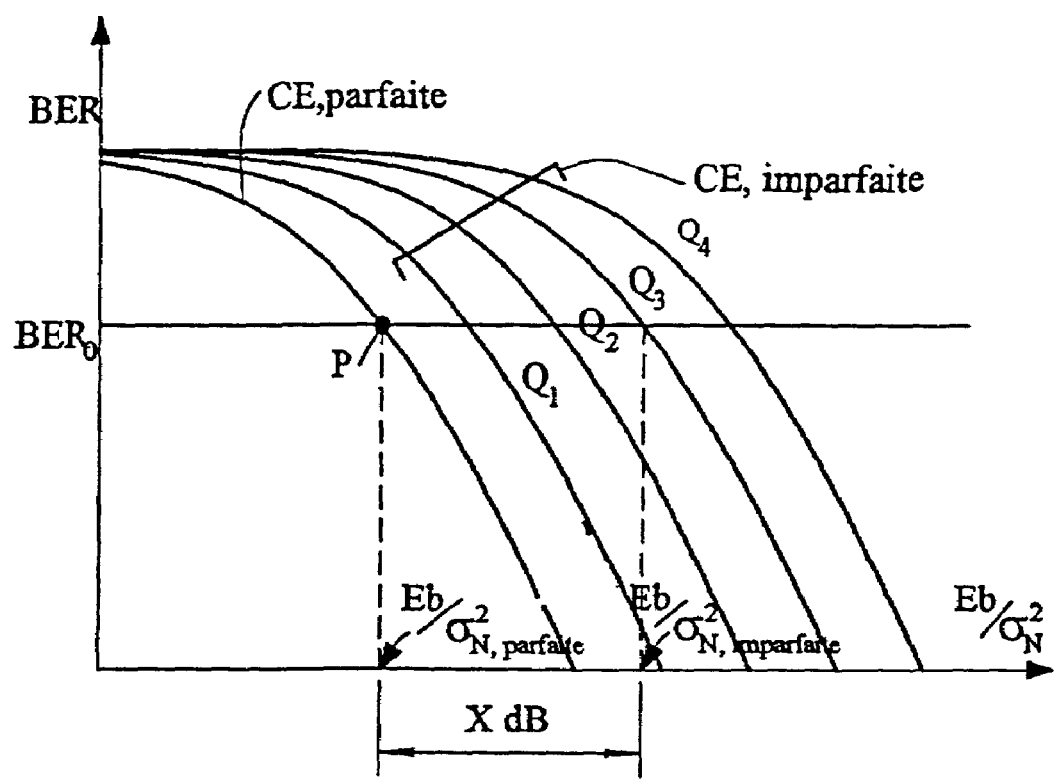
FIG. 3 shows a set of curves representing the bit error rates BER as a function of the signal to noise ratio Eb/No.

FIG. 3 depicts a set of curves representing the bit error rate BER as a function of the signal to noise ratio Eb/No respectively in the case of a perfect channel estimation and in several cases of imperfect channel estimation for different pilot symbol transmission powers $Q_1$ to $Q_4$. The required error rate $BER_0$ has been shown in this FIG. 3.

On the curve for perfect channel estimation, the operating point P has been shown. From this operating point P, it is possible to determine the variance $\sigma_{N,perfect}^2$ of the corresponding noise. This determination can be done graphically but also sometimes analytically by methods known to persons skilled in the art.

By means of the above expression (11), it is possible to determine a total interference variance $\sigma_{CE,perfect}^2$ which, as a function of the variance $\sigma_{N,perfect}^2$ previously determined, can be written:

$$\sigma_{CE,perfect}^2 = \frac{1}{N}(\sigma_{N,perfect}^2 + K - 1) \quad (14)$$

The following will be written:

$$\sigma_{CE,perfect}^2 = \sigma_0^2 \quad (15)$$

For an imperfect channel estimation, the signal to noise ratio Eb/No must be increased in order to obtain the same error rate. It is then written:

$$\sigma_{N,imperfect}^2 = \frac{\sigma_{N,perfect}^2}{\lambda} \text{ with } \lambda > 1 \quad (16)$$

The term $\lambda$ represents the loss in signal to noise ratio tolerated for an imperfect estimation. FIG. 3 shows its value X expressed in decibels: $X = 10 \log_{10}(\lambda)$.

The variances of the total interferences $\sigma_{CE,perfect}^2$ and $\sigma^{CE,imperfect2}$ respectively in the case of a perfect estimation and in the case of an imperfect estimation are assumed to be equal to the variance of the total interference $\sigma_0^2$. They therefore satisfy the following conditions:

$$\sigma_0^2 = \sigma_{CE,perfect}^2 \bigg|_{\sigma_N^2 = \sigma_{N,perfect}^2} = \sigma_{CE,imperfect}^2 \bigg|_{\sigma_N^2 = \frac{\sigma_{N,perfect}^2}{\lambda}} \quad (17)$$

It can be shown that the required pilot power Q for these conditions to be complied with, having regard to the above equations, satisfies the following equation:

$$Q = \frac{1}{\gamma}\left(\frac{N\sigma_0^2 + 1}{\lambda^2 - \lambda} + \frac{1}{\lambda}K\right); \lambda > 1 \quad (18)$$

It can then be seen that the coefficients $\alpha$ and $Q_0$ can be written as follows:

$$\alpha = \frac{1}{\gamma\lambda} \text{ and } Q_0 = \frac{N\sigma_0^2 + 1}{\gamma\lambda(\lambda - 1)} + \frac{1}{\gamma\lambda} \quad (19)$$

It should be noted that this equation has been determined in the case of an MC-CDMA transmission system but it will also be understood that it remains applicable to other transmission systems of the multicarrier type with spreading of the signal in the frequency domain by spreading sequences.

The invention claimed is:

1. Method of determining a transmission power of transmitted pilot symbols used for estimating channel coefficients by replacing useful signals in a transmission frame of a multicarrier transmission system with OFDM-CDMA, MC-CDMA, MC-CDM or MC-SS-MA frequency domain spreading sequences the method comprising:
   a) determining a performance level to be achieved by the transmission frame;
   b) deducing the signal to noise ratio level from the performance level to be achieved;
   c) deducing a single code transmission power $Q_0$ of the pilot symbols for a single spreading code from the signal to noise ratio level;
   d) deducing an increase in power $\alpha$ for transmitting the pilot symbols using a number of spreading codes K; and
   e) determining, at predetermined times, the transmission power Q of the pilot symbols based on the following equations:

$Q=\alpha(K-1)+Q_0$, $K>1$, $\alpha>0$, and $Q_0>\alpha$.

2. Method of determining the transmission power of pilot symbols according to claim 1, further comprising:
   determining an ideal signal to noise ratio for a perfect channel estimation at the performance level to be achieved; and
   obtaining the signal to noise ratio by increasing the ideal signal to noise ratio level by a predetermined quantity to compensate for degradations in the performance level to be achieved resulting from an imperfect channel estimation.

3. The method of claim 2, further comprising:
   deducing the single code transmission power $Q_0$ and the increase in power $\alpha$ such that the performance level to be achieved is a same level for the perfect channel estimation and the imperfect channel estimation.

4. Method of determining the transmission power of pilot symbols according to claim 2, further comprising:
   calculating the single code transmission power $Q_0$ and the increase in power $\alpha$ according to the following equations:

$$\alpha = \frac{1}{\gamma\lambda} \text{ and}$$

$$Q_0 = \frac{N\sigma_0^2 + 1}{\gamma\lambda(\lambda - 1)} + \frac{1}{\gamma\lambda}$$

wherein the multicarrier transmission system includes a MC-CDMA transmission system, N is a number of carriers used in the MC-CDMA transmission system, $\gamma$ is a smoothing gain used in a detection process, $\lambda$ is a factor representing an increase in signal to noise ratio between the perfect channel estimation and the imperfect channel estimation, and $\sigma_0^2$ is a variance of total interference between the perfect channel estimation and the imperfect channel estimation.

5. Method of determining the transmission power of pilot symbols according to claim 1, further comprising:
   deducing the single code transmission power $Q_0$ and the increase in power $\alpha$ such that the performance level to be achieved is a same level for a perfect channel estimation and an imperfect channel estimation.

6. Method of determining the transmission power of pilot symbols according to claim 1, further comprising:
   calculating the single code transmission power $Q_0$ and the increase in power $\alpha$ according to the following equations:

$$\alpha = \frac{1}{\gamma\lambda} \text{ and}$$

$$Q_0 = \frac{N\sigma_0^2 + 1}{\gamma\lambda(\lambda - 1)} + \frac{1}{\gamma\lambda}$$

wherein the multicarrier transmission system includes a MC-CDMA transmission system, N is a number of carriers used in the MC-CDMA transmission system, $\gamma$ is a smoothing gain used in a detection process, $\lambda$ is a factor representing an increase in signal to noise ratio between a perfect channel estimation and an imperfect channel estimation and $\sigma_0^2$ is a variance of total interference between the perfect channel estimation and the imperfect channel estimation.

7. The method of claim 1, wherein the performance level to be achieved includes a mean bit error rate (BER).

* * * * *